F. McKIMMY.
FISHING REEL.
APPLICATION FILED FEB. 11, 1920.
1,353,170.
Patented Sept. 21, 1920.
2 SHEETS—SHEET 1.
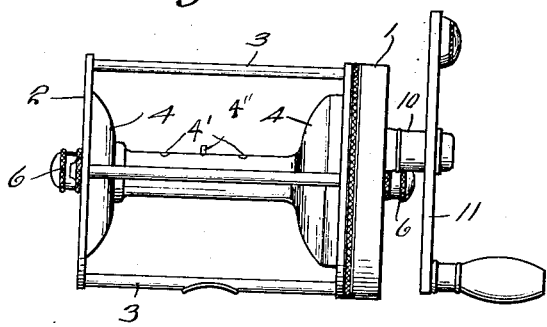
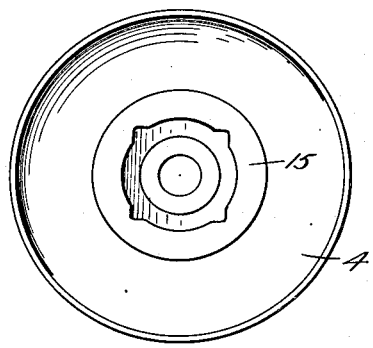
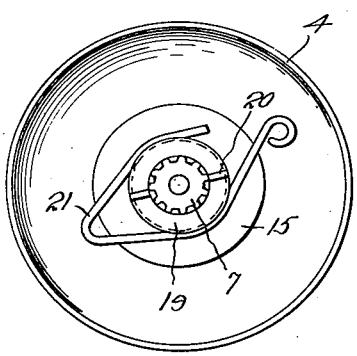
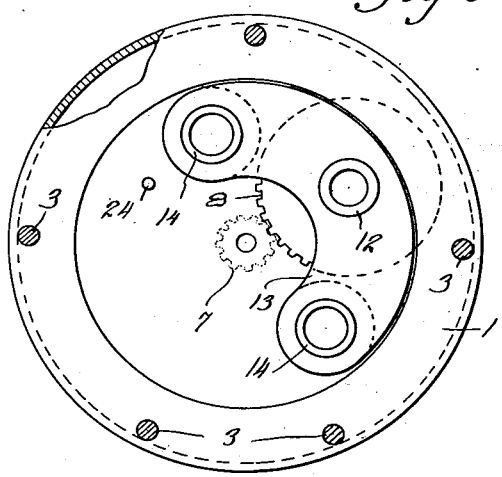
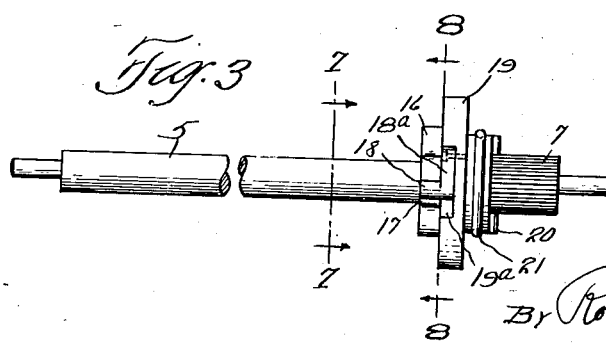
Inventor
F. McKimmy

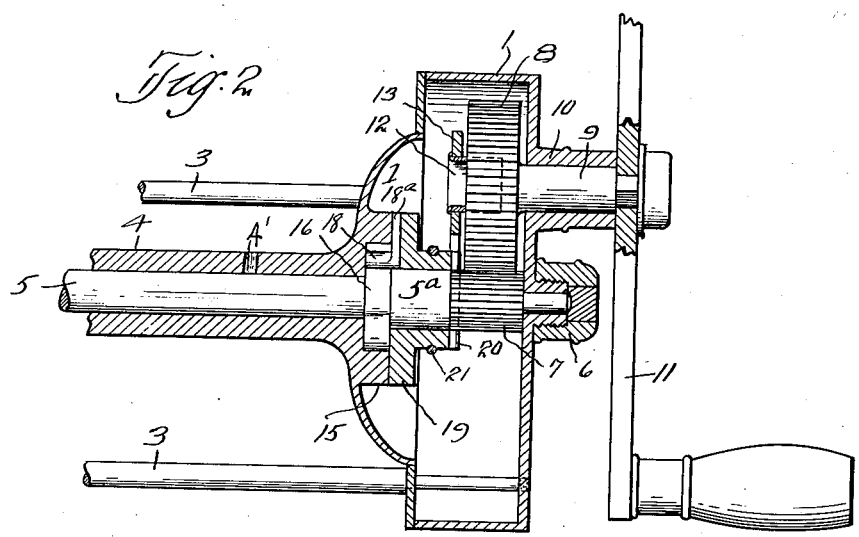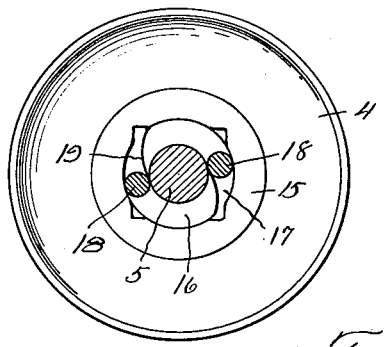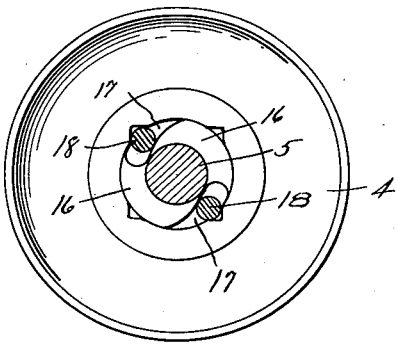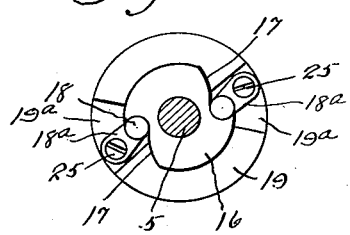

UNITED STATES PATENT OFFICE.

FRED McKIMMY, OF BEAVER DAM, OHIO.

FISHING-REEL.

1,353,170.  Specification of Letters Patent.  Patented Sept. 21, 1920.

Application filed February 11, 1920. Serial No. 357,922.

*To all whom it may concern:*

Be it known that I, FRED MCKIMMY, a citizen of the United States, residing at Beaver Dam, in the county of Allen and State of Ohio, have invented certain new and useful Improvements in Fishing-Reels, of which the following is a specification.

The present invention relates to certain new and useful improvements in fishing reels, and has for its object to provide a device of this character which embodies novel features of construction whereby the spool is automatically disengaged from the driving gear so as to run freely when casting or paying out the line, although it is instantly connected with the driving gear as soon as the crank handle is rotated to turn the spool for the purpose of winding the line thereon.

Further objects of the invention are to provide a fishing reel of this character which is comparatively simple and inexpensive in its construction, which is not liable to break or get out of repair, and which can be used in the same manner as an ordinary reel, although it has the additional advantage of a free running spool for paying out the line.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a front elevation of a fishing reel constructed in accordance with the invention.

Fig. 2 is an enlarged sectional view through the end of the reel within which the driving mechanism is mounted.

Fig. 3 is a detached view of the shaft and clutch mechanism.

Fig. 4 is an end view of the spool, showing the clutch ring thereon.

Fig. 5 is a similar view, showing the shaft and clutch mechanism in connection with the reel.

Fig. 6 is an enlarged view of the hollow head or end plate within which the driving gear for the spool is mounted, parts being broken away and shown in section, looking at the end piece from the inner side thereof.

Fig. 7 is a transverse sectional view on the line 7—7 of Fig. 3, looking in the direction of the arrows.

Fig. 8 is a transverse sectional view on the line 8—8 of Fig. 3, looking in the direction of the arrows, and also showing the end of the spool, the clutch being in inoperative position to permit the spool to turn freely on the shaft.

Fig. 9 is a view similar to Fig. 8, showing the clutch in operative position for locking the spool with the shaft.

Corresponding and like parts are referred to in the following description and indicated in all the views of the drawings by the same reference characters.

Referring to the drawings, which illustrate one possible embodiment of the invention, the numerals 1 and 2 designate two opposed heads which have a spaced relation and are connected by the usual tie bars 3. The head 1 is hollow to provide a housing for the driving gear, and the spool 4 is journaled on a shaft 5 which connects the heads, the extremities of the shaft being received within the usual bearings 6. Suitable oil holes 4' are provided together with means 4'' for attachment of the line.

The end of the shaft 5 which is located within the hollow head 1 is provided with a pinion 7 which meshes with a gear 8 on a short drive shaft 9. This shaft is journaled in a bearing sleeve 10 which projects outwardly from the hollow head 1, the outer end of the shaft having a conventional handle or crank 11 fitted thereon, while the inner end of the shaft engages a bearing member 12 on a plate 13, said plate being arranged within the hollow head and supported at its ends by the members 14.

The end of the spool 4 adjacent the hollow head 1 is provided with a clutch ring 15 which projects therefrom, said ring receiving a disk 16 which is rigid with the shaft 5 and being provided in its inner periphery with notches 17 which are adapted to interlock with clutch dogs 18 to lock the spool and shaft together. These dogs are carried by a plate or disk 19 which is loosely mounted upon an enlarged portion 5ª of the shaft 5, said enlarged portion of the shaft being arranged between the disk 16 and the pinion 7. A pin 20 extends transversely through the shaft and coöperates with the disk 16 to retain the plate 19 in position.

A hub portion 19ª which is provided in conjunction with the disk or plate 19 is frictionally engaged by a spring 21 so that there is a drag upon the disk when it is rotated in either direction. This spring 21, as indicated more clearly by Fig. 5, is in the form of a length of wire which is returned upon itself to provide a pair of arms, said arms being seated within a groove 22 on the hub 19ª and frictionally engaging the same. One of the arms of the spring is extended and terminates in an eye 23 which engages a pin 24 projecting into the interior of the hollow head 1 from the end wall thereof. The spring is thus held against turning with the disk or plate and offers a slight frictional resistance to the rotation of the disk or plate.

The dogs 18 are formed with swinging arms 18ª which are received within recessed portions 19ª of the disk 19 and pivotally connected thereto at 25. The plate 16 which turns freely within the clutch ring 15 is provided with cam notches 26 which receive the dogs 18 and permit the latter to become disengaged from the clutch ring 15 when the spool is revolving in one direction, although upon any movement of the shaft to wind the line upon the spool the cam faces of the notches 26 instantly force the dogs outwardly into engagement with the notches 17 of the clutch ring 15, thereby locking the spool with the shaft and connecting it with the driving gear.

When there is a relative rotation of the spool with respect to the shaft 5, as when unwinding the line from the spool, the dogs 18 will be retracted into the cam notches 26 of the plate 16 and disengaged from the clutch ring 15, thereby releasing the spool from the shaft and driving the gear so that it can be revolved freely. This position of the clutch is indicated by Fig. 8. This will be a very distinct advantage when casting, and the mechanism which I have provided is simple and dependable in its action. However, if the handle 11 is manipulated to wind the line upon the spool, the rotation of the shaft 5 and the plate 16 thereon will cause the cam faces of the notches 26 in the plate to force the dogs 18 outwardly and bring them into engagement with the notches or depressions 17 of the clutch ring 15 on the end of the spool. This position of the clutch is illustrated by Fig. 9, and the spool is then locked with the shaft and driving gear so that it can be positively rotated to wind the line upon the spool as the crank handle is turned. The spring 21 produces the necessary drag upon the disk 19 to insure the proper action of the clutch.

While I have illustrated and described one particular embodiment of the invention, it will be obvious that many changes and modifications are possible in the various details of construction without departing from the spirit of the invention as defined by the claims.

Having thus described the invention, what I claim as new and desire to secure by Letters Patent, is:—

1. The combination in a fishing reel including a spool, end plates, shaft and gearing for driving the shaft, of a clutch comprising a clutch ring projecting from one end of the reel, a cam plate rigid with the shaft and loosely received within the clutch ring of the spool, a disk loose upon the shaft and arranged at one side of the clutch ring, means upon the shaft for holding the disk removably in position upon the shaft adjacent to the cam plate, the disk having recesses in one side thereof, dogs formed with shanks which are received within the recesses and pivotally connected to the disk, the swinging ends of the dogs having laterally projecting heads which are received between the cam plate and the clutch ring and are adapted to be projected into engagement with the clutch ring by the action of the cam plate, and drag means for the disk.

2. The combination in a fishing reel, including a spool, end plates, shaft and gearing for rotating the shaft, of a clutch comprising a clutch ring projecting from one end of the reel, a cam plate rigid with the shaft and loosely received within the clutch ring, a disk loose upon the shaft, means upon the shaft for removably confining the disk in position thereon adjacent to the cam disk, dogs formed with shanks which are pivotally mounted on the disk toward the periphery thereof and extend inwardly toward the center of the disk, the swinging ends of the dogs terminating in laterally projecting heads which are received between the cam plate and the clutch ring and are adapted to be forced into a positive engagement with the clutch ring by the action of the cam plate, and drag means for the disk.

In testimony whereof I affix my signature.

FRED McKIMMY.